No. 650,377. Patented May 29, 1900.
J. F. DORNFELD.
MALTING DRUM.
(Application filed Jan. 3, 1899.)
(No Model.) 3 Sheets—Sheet 1.

Witnesses.
Inventor
John F. Dornfeld
By Benedict and Morsell
Attorneys.

No. 650,377. Patented May 29, 1900.
J. F. DORNFELD.
MALTING DRUM.
(Application filed Jan. 3, 1899.)
(No Model.) 3 Sheets—Sheet 2.

Witnesses.
Inventor.
John F. Dornfeld
By Benedict and Morsell
Attorneys.

No. 650,377. Patented May 29, 1900.
J. F. DORNFELD.
MALTING DRUM.
(Application filed Jan. 3, 1899.)
(No Model.) 3 Sheets—Sheet 3.
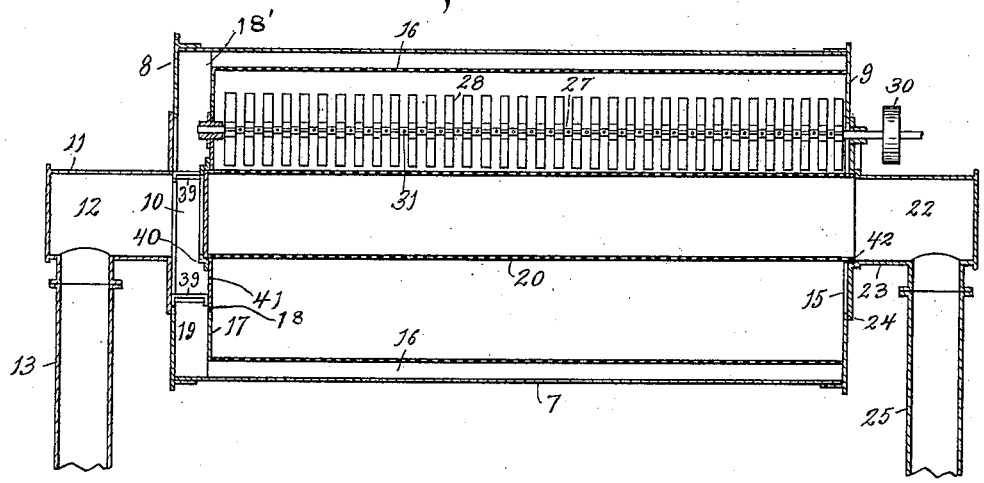
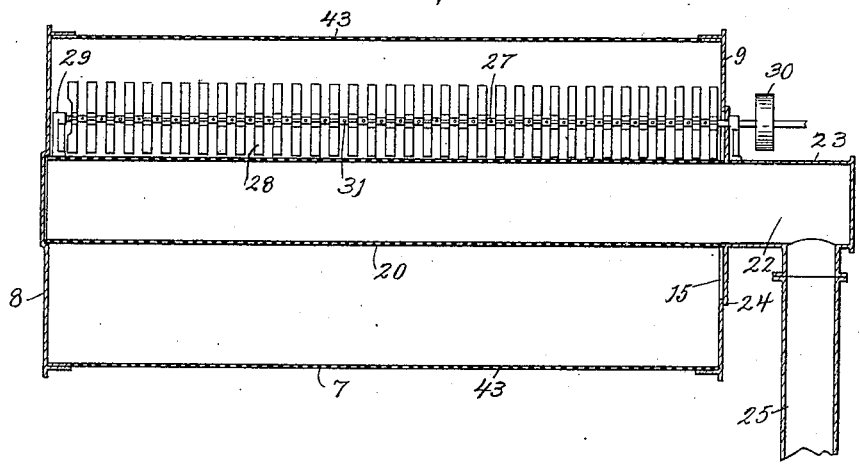
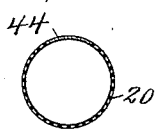
Witnesses.
O. H. Keeney.
Anna V. Faust.
Inventor.
John F. Dornfeld.
By Benedict and Morsell
Attorneys.

UNITED STATES PATENT OFFICE.

JOHN F. DORNFELD, OF MILWAUKEE, WISCONSIN.

MALTING-DRUM.

SPECIFICATION forming part of Letters Patent No. 650,377, dated May 29, 1900.

Application filed January 3, 1899. Serial No. 700,969. (No model.)

*To all whom it may concern:*

Be it known that I, JOHN F. DORNFELD, of Milwaukee, in the county of Milwaukee and State of Wisconsin, have invented a new and useful Improvement in Malting-Drums, of which the following is a description, reference being had to the accompanying drawings, which are a part of this specification.

My invention has relation to improvements in malting-drums.

The primary object of the invention is to provide, in a malting-drum, an improved construction for positively stirring the steeped barley contained in the drum, whereby the contents of the drum are properly stirred and mixed at all times.

A further object is to provide an improved means for introducing water into the malt whenever necessary in an even and regular quantity and in such manner that the water is thoroughly mixed with the malt.

With the above primary and other incidental objects in view the invention consists of the devices and parts or their equivalents, as hereinafter fully set forth.

Figure 1:
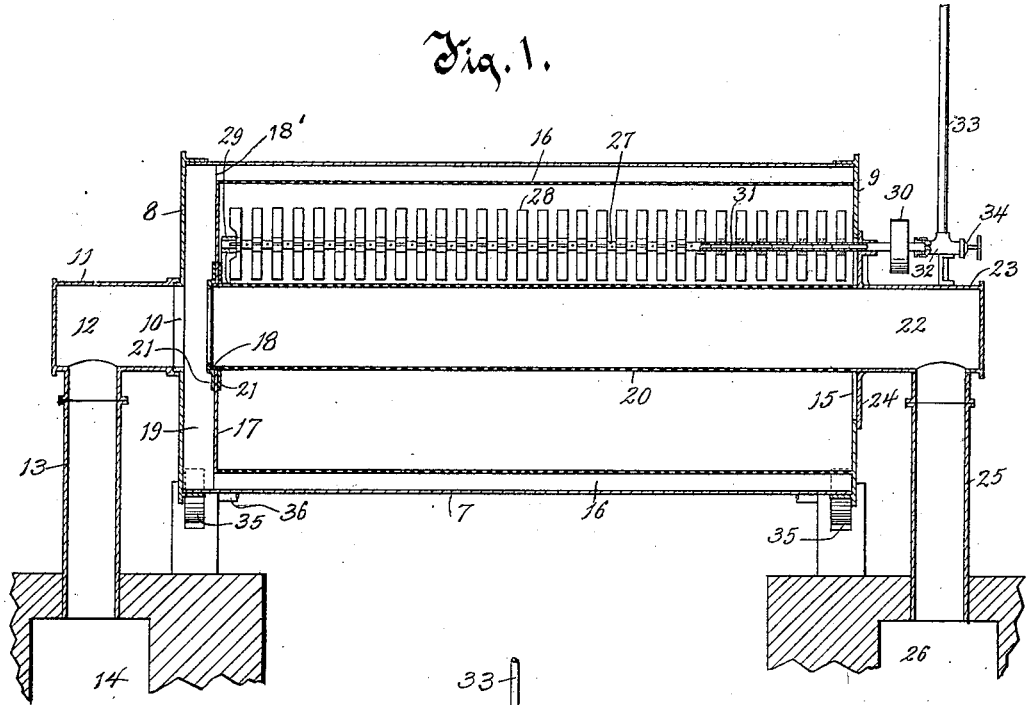
Figure 2:
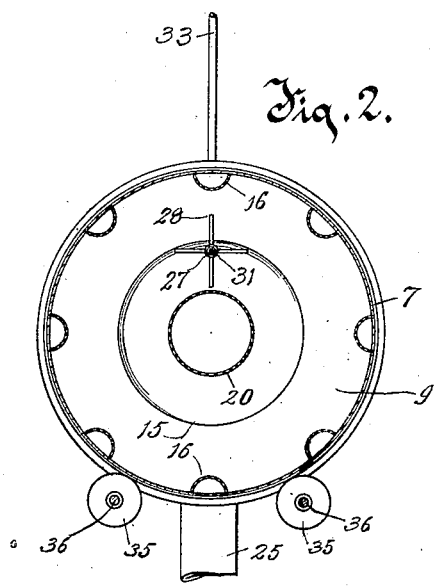
Figure 3:
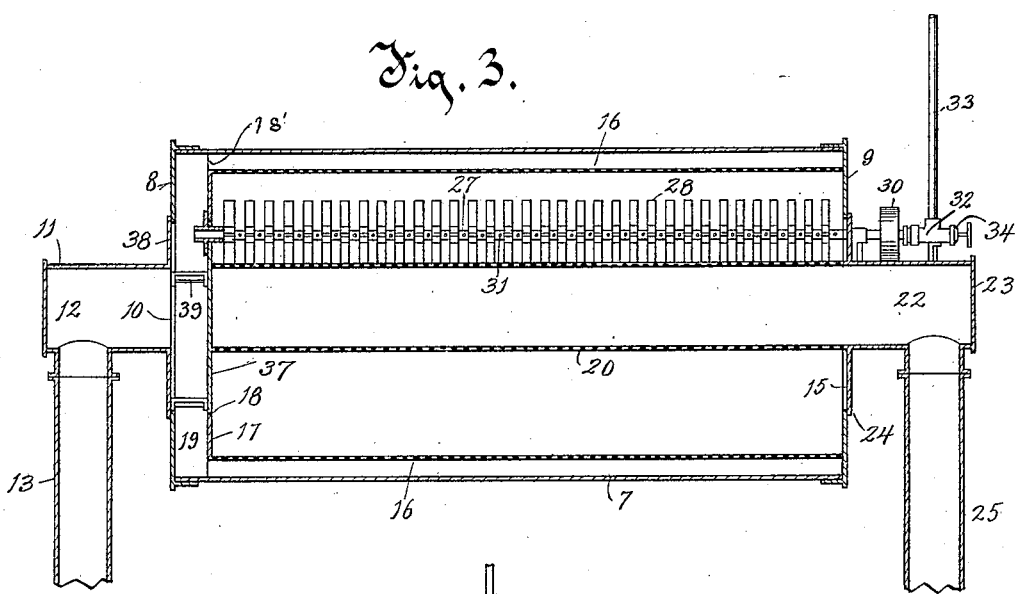
Figure 4:
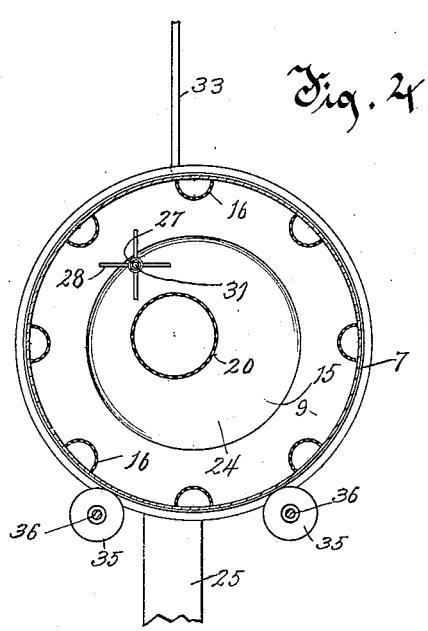

In the accompanying drawings, Figure 1 is a longitudinal vertical sectional view through the drum and allied mechanism. Fig. 2 is a transverse section of Fig. 1. Fig. 3 is a longitudinal vertical sectional view through a modified form of drum. Fig. 4 is a transverse section of Fig. 3. Figs. 5 and 6 are longitudinal sectional views through other modified forms of drum, and Fig. 7 is a cross-section through a modified form of inner cylinder.

Referring to the Fig. 1 and 2 form of construction, the malting-drum is shown as composed of an outer cylindrical casing 7. To the opposite ends of this casing are fitted headpieces, (designated by the numerals 8 and 9, respectively.) The headpiece 8 is formed with a central opening 10, and to the bordering edge of this opening is fitted a tube 11, forming a chamber 12. This tube has extending therefrom a pipe 13, which connects with a tunnel, duct, or passage 14, leading from a source of supply of moist purified air. The opposite headpiece 9 has an opening 15 of considerably-greater circumference than the opening 10 of the other headpiece. The interior of the cylindrical casing 7 is provided with a series of longitudinal perforated tubes 16, preferably of semicylindrical form, said tubes extending from the headpiece 9 at one end to an inner annular plate or headpiece 17 at their opposite ends, said plate having a central opening 18 and also other small openings 18', with which smaller openings the tubes 16 connect. The space between this plate 17 and the outer headpiece 8 forms a chamber 19.

The numeral 20 indicates a central perforated cylinder, one end of which enters the opening 18 of plate 17. This end of the cylinder is closed to the chamber 19, and said end is also formed therearound with annular flanges 21 21 to receive therebetween the bordering edge of the central opening 18 of plate 17. The opposite end of the cylinder communicates with a chamber 22, preferably formed by an imperforate extension 23 of the cylinder, which extension projects through the opening 15 of the headpiece 9. The outer end of this extension 23 is closed, as clearly shown. This extension 23 is also formed or provided therearound with a flange 24, preferably of annular form and of sufficient area to cover or close the opening 15 and fitting against the outer side of the headpiece 9. A pipe or passage 25 extends from the imperforate extension and communicates with a tunnel, duct, or passage 26, which latter communicates with a suction-fan, (not shown,) so that air may be thereby drawn through the drum and its contents.

The stirring mechanism is located within the drum and extends longitudinally thereof, as clearly shown. This stirring mechanism may be of any approved form of construction, so long as projections, fingers, or blades are provided, with means for rotating the same. I prefer, however, to provide the form of stirring mechanism clearly shown in the drawings, which consists of a shaft 27, extending longitudinally within the drum and having a series of stirring fingers or blades 28 radiating therefrom. At one end this shaft is mounted in a bearing 29, extending upwardly from the central cylinder 20, and the other end of this shaft passes through the large opening 15 of the headpiece 9 and also through the flange 24, which flange therefore forms a bearing for this end of the shaft. It will be obvious, therefore, that the large opening 15 in the headpiece 9 is necessary in order to permit the stirrer-shaft to pass freely therethrough, and thereby not interfere with the rotation of the drum, and to also provide for this end of the shaft extending beyond the end of the drum, so as to be capable of being rotated by suitable means. For the bearing of this extension of the shaft therefore I provide the flange 24, which flange at the same time covers the large opening 15. On this extended portion of the shaft is mounted a pulley 30, adapted to receive a belt therearound for rotating the same. I prefer to employ a tubular or hollow shaft for the stirrers, as clearly shown, said hollow shaft provided with a series of openings 31 throughout its length. I prefer to employ this hollow shaft with the openings referred to, so that water may be forced through the shaft and out of the openings thereof for the purpose of watering the malt whenever this is found necessary.

By my construction an even feed and supply of water can be readily secured. In order to provide for feeding water into the hollow stirrer-shaft, I connect the outer extended end of said shaft to a coupling 32, a stuffing-box being fitted onto the end of the shaft and to the coupling in order to provide a water-tight joint. A water-supply pipe 33 leads to this coupling, and a cock 34 is provided for regulating the supply of water passing into the stirrer-shaft.

The drum may be rotated by any desired means, and in Figs. 1, 2, and 4 I have shown for that purpose rolls 35, carried on suitable shafts 36, said rolls bearing against the periphery of the drum and adapted to rotate said drum by friction. The shafts 36 may be rotated positively by any desired means. (Not shown.)

In the operation of my improved drum the moist purified air from the duct or passage 14 is drawn through the pipe 13 and chamber 12 into the space 19 at the adjacent end of the drum, said air first striking against the annular plate 17, and thence being deflected to the open ends of the tubes 16, thence entering said tubes and passing through the perforations thereof into the space of the drum which surrounds the central cylinder 20, thence being drawn by the suction-fan hereinbefore referred to through the perforations of the cylinder 20 into said cylinder, thence along said cylinder, thence into the chamber 22, pipe 25, and duct or passage 26 to the aforesaid suction-fan. When the air is thus drawn from the tubes 16 into the space of the drum which surrounds the central cylinder 20, it is of course drawn through the grain or malt in the revolving drum before passing into the cylinder 20, it being understood that the drum is filled with steeped barley to such height that said barley will about cover the central cylinder 20.

It will be further understood that during the operation just explained power may be applied to the stirrer-shaft by any approved means, so as to rotate said shaft and the stirrers carried thereby. In the present illustration of my invention I have shown the belt-pulley 30 as the means for rotating said shaft. The stirrers also not only act on the malt which is located distant from the central cylinder 20, but also act to pick up the malt next to said central cylinder and throw said malt out toward the periphery of the drum. By this arrangement no more room is required than in the ordinary forms of malting-drums, and, besides, the malt is stirred properly and all of said malt is mixed at all times. In some forms of malting-drums the stirring is attempted to be accomplished merely by the revolving of the drum. The result is that there is no positive stirring, in view of the fact that after the malt has been in the drum for a certain time the germinating process begins and the germinating malt will of course fill up the drum more and more and will pack against the inner cylinder, and consequently the mere revolving of the drum will only cause the malt distant from the central cylinder to slide and mix, while the malt which is packed around the central cylinder will not be stirred or affected, but will still adhere to the cylinder without slipping. The facts are that the malt at a later stage and when the stirring is required to be most effective is not mixed and stirred as well as when first placed in the drum. It will be clear that my improved construction entirely obviates this disadvantage.

The provision of the stirrer described, in a malting-drum, has the advantage over other known apparatuses in that the malt-roots are not broken or otherwise seriously injured, for the reason that the stirrer always works in a thin, loose, or rolling layer on the upper side of the drum.

When it is desired to water the malt, the cock 34 is opened, so as to admit the water into the hollow shaft 27, and this water issues out of the openings 31 of said shaft and is distributed evenly over and through the mass of malt contained within the drum. By my improved construction where a revolving perforated pipe is provided the water must of necessity be evenly distributed through the malt, and at the same time the quantity of water may be readily regulated merely by turning the cock 34.

In Figs. 3 and 4 of the drawings I show a slightly-modified form of construction, wherein the inner longitudinal cylinder as well as the stirring mechanism are arranged eccentrically. As my stirring mechanism is adapted to throw the malt to one side, it is obvious that by arranging the parts mentioned eccentrically the packed malt will move with greater ease around the stationary central cylinder, as it is continually moving into a wider space. In order to conveniently provide for this eccentricity of the parts mentioned, I prefer to employ a slightly-modified construction, which will now be explained.

One end of the cylinder 20 is provided with an annular flange 37, which is eccentric to said cylinder, and the edge of said annular flange fits the bordering edge of the enlarged opening 18 of the annular plate 17. The stirrer-shaft 27 is also mounted eccentrically in this annular flange, as clearly shown, instead of being mounted in a separate bearing 29, extending from the cylinder 20, as in the Fig. 1 construction. The headpiece 8 of the drum and the tube 11 are also in this form shown as constructed somewhat differently, viz: The opening 10 of said headpiece is shown as considerably enlarged, and the inner end of the tube 11 is shown as provided with an annular flange 38, which overlaps the bordering edge of the opening 10. I also prefer in this form to provide braces 39, which extend across the space 19 and connect to the annular flanges 37 and 38, respectively. Of course in this modified construction the right-hand end of the cylinder 20 must also necessarily connect to or join with the annular flange 24 eccentrically.

Fig. 5 illustrates another modification in the construction and arrangement, whereby the inner cylinder 20 is made capable of revolving either by the friction of the contained mass within the drum or by other desirable means. To provide for this, the left-hand end of said cylinder fits loosely in an annular recess in a ring 40. The cylinder 20 also, near this end, fits loosely in a central opening of a disk 41, which fits loosely in the opening 18 of the plate 17. The left-hand end of the stirrer-shaft is mounted in the disk 41. The right-hand end of the cylinder 20 fits loosely in an annular recess 42, formed in the tube 23, said tube in this form being separate from the cylinder 20, and the flange 24 is formed as a part of tube 23. It is obvious that by thus mounting the cylinder 20 loosely it is capable of being revolved by the friction of the contained malt in the drum, or suitable provision may be provided for positively rotating said cylinder merely by extending one end thereof—say the right-hand end—a sufficient distance beyond the end of the drum to permit of rotating mechanism being secured thereto and fitting the extension 22 to the extending end of cylinder 20.

Fig. 6 represents a modification of my invention, in which certain parts hereinbefore described are entirely omitted. At the left-hand end of the drum the inner annular plate 17 is entirely omitted, and consequently the space 19 and the longitudinal tubes 16 are also entirely omitted. The left-hand end of the cylinder 20 in this form is mounted loosely in the headpiece 8 of the drum, so as to enable the drum to rotate freely therearound. The stirrer-shaft at one end is journaled in a bearing 29, extending upwardly from the cylinder 20, and the opposite end of said shaft is journaled in the flange 24, the same as in the Fig. 1 form of construction. The end chamber 12 and the pipe 13, leading to the conduit 14, are also entirely omitted, and only one extended chamber and pipe leading therefrom and communicating with a tunnel or passage are shown, said extended chamber corresponding to the chamber 22 and the pipe leading therefrom to the pipe 25 of the other figures of the drawings. The cylindrical casing of the drum in this modified form of construction is shown as provided with a series of perforations 43. In the operation of this form of device if the suction-fan is applied to the tunnel or chamber 26 to which the pipe 25 leads air is drawn directly from the room in which the drum is located through the perforations 43 of said drum, thence through the mass of malt located within the drum, thence through the perforations of the cylinder 20 into said cylinder, thence along said cylinder to the chamber 22 into the pipe 25 and to the tunnel 26. A reversal of this operation may be secured by omitting the suction-fan in the tunnel 26 and providing means for forcing fresh air through said tunnel into the pipe 25, thence into chamber 22, thence into cylinder 20, thence through the perforations of said cylinder 20, thence through the mass of malt contained within the drum, and thence out through the perforations 43 into the room.

While I have herein shown and described certain details of construction, yet I do not wish to be understood as limiting myself thereto, as any slight modifications or variations which will accomplish the same result are within the spirit and scope of my invention. For instance, it is obvious that instead of forcing the fresh air through the tunnel 14, thence into the pipe 13, and sucking said air through the described course by means of a suction-fan acting in the tunnel 26 the fresh air may be forced through the tunnel 26, thence into pipe 25, thence into chamber 22, thence into cylinder 20, thence through the perforations of said cylinder and through the malt contained in the drum, thence through the perforations of tubes 16, thence through said tubes into space 19, thence into chamber 12, and thence sucked from said chamber through pipe 13 into tunnel 14 by means of a suction-fan located within said tunnel. I also do not wish to be understood as limiting myself to the exact form of stirring mechanism herein shown and described, as any suitable form of stirring mechanism arranged longitudinally of the drum may be adopted without departing from the spirit and scope of my invention.

While I have shown in Fig. 5 of the drawings a form of malting-drum provided with an inner cylinder capable of being rotated, yet the inner stationary cylinder shown in other figures of the drawings is preferable, as it possesses in itself a distinct advantage. This advantage resides in the fact that the malt carried around such stationary cylinder causes friction against the same, which in itself is a stirring process and tends to keep the roots from growing into the same. There being hardly any weight of malt against all the lower side of the perforated cylinder 20, the holes have no chance to clog up and being on the side where the ventilating should be the most perfect. I wish further to be understood as claiming, in combination with a malting-drum, a perforated movable pipe arranged longitudinally and eccentrically of said drum and mounted in bearings independent of and non-revoluble with the drum, the said pipe being therefore non-revoluble around the axis of the drum, whereby it is caused to occupy the same relative position in the drum. This tube is adapted for discharging water out of the perforations thereof and through the mass of malt contained within the drum.

In Fig. 7 of the drawings I have shown a cross-sectional view of a modified form of the inner cylinder 20, wherein the upper portion 44 of said cylinder is imperforate. This is perhaps the preferable construction, inasmuch as the upper side of said cylinder should not be perforated, for the reason that if perforations were provided they would clog up, would be found hard to clean, and, furthermore, they are not required at this portion of the cylinder, because the malt lies thin at said portion, and the air rushing through would do little good and would be wasted.

What I claim as my invention is—

1. The combination, of a revoluble malting-drum, an interior cylinder extending longitudinally of the drum, and stirring mechanism located in the space between the interior cylinder and the outer shell of the drum, said stirring mechanism being mounted in bearings, which bearings are independent of and non-revoluble with the drum.

2. The combination, of a revoluble malting-drum, an interior cylinder extending longitudinally of the drum, bearings extending from the interior cylinder, and stirring mechanism located in the space between the interior cylinder and the outer side or shell of the drum, said stirring mechanism movable in the bearings, and adapted to stir the malt in the upper portion of the drum as said drum revolves, without being carried around with the drum.

3. The combination, of a revoluble malting-drum, an interior cylinder extending longitudinally of the drum, and stirring mechanism located in the upper portion of the drum and movable in bearings extending from said interior cylinder, said drum thereby adapted to revolve without carrying therewith the stirring mechanism.

4. The combination, of a revoluble malting-drum, an interior cylinder extending longitudinally of the drum, stirring mechanism, the entire stirring mechanism located in the upper portion of the drum, and bearings for the axis of the stirring mechanism, said bearings extending from the interior cylinder, whereby the drum is permitted to revolve, without carrying therewith the stirring mechanism, said stirring mechanism thereby occupying at all times the same position in the upper portion of the drum.

5. The combination, of a malting-drum having one of its headpieces provided with an opening, a flange as 24 covering said opening of the headpiece, a plate forming an inner headpiece, said plate provided with an opening, a flange fitting the opening of said plate forming the inner headpiece, and a perforated cylinder, said cylinder connected at one end to the flange 24, and having its opposite end connected to the flange which fits the opening of the plate forming the inner headpiece of the drum.

6. The combination, of a malting-drum having one of its headpieces provided with an opening, a flange as 24 covering said opening of the headpiece, a plate forming an inner headpiece, said plate provided with an opening, a flange fitting the opening of said plate forming the inner headpiece, and a perforated cylinder arranged eccentrically within the drum, said cylinder connected at one end to the flange 24, and having its opposite end connected to the flange which fits the opening of the plate forming the inner headpiece of the drum.

7. The combination, of a malting-drum having one of its headpieces provided with an opening, a flange as 24 covering said opening of the headpiece, a plate forming an inner headpiece, said plate provided with an opening, a flange fitting the opening of said plate forming the inner headpiece, a perforated cylinder arranged eccentrically in the drum, said cylinder connected at one end to the flange 24, and connected at its opposite end to the flange which fits the opening of the plate forming the inner headpiece of the drum, and stirring mechanism extending longitudinally in the drum, and having the ends of its shaft journaled in the said flanges.

8. The combination, of a malting-drum having one of its headpieces provided with an opening, a plate forming an inner headpiece, said plate provided with an opening, a disk as 41 fitting the opening of the plate, and a perforated cylinder extending longitudinally in the drum, and having one end fitting freely in an opening in the disk 41, and having its opposite end fitting freely in the opening of the headpiece of the drum.

9. The combination, of a revoluble malting-drum, a perforated, movable tube extending longitudinally and eccentrically in the drum and mounted in bearings independent of and non-revoluble with the drum, whereby the tube occupies at all times the same relative position in the drum and is non-revoluble around the axis of the drum, the drum being thereby adapted to revolve without carrying the tube therewith.

10. The combination, of a revolving malting-drum, a perforated cylinder within the body of the drum, and a stirring and watering mechanism located in the space between the interior cylinder and the outer shell of the drum, said stirring and watering mechanism mounted in bearings independent of and non-revoluble with the drum.

11. The combination, of a revoluble malting-drum, a perforated cylinder extending longitudinally in the drum, a movable, tubular perforated stirring and watering tube extending longitudinally and eccentrically in the drum and located in the space between the interior cylinder and the outer shell of the drum, said stirring and watering mechanism being mounted in bearings independent of and non-revoluble with the drum.

12. The combination, of a revoluble malting-drum, a perforated cylinder extending longitudinally in the drum, a movable, tubular, perforated stirring and watering tube extending longitudinally and eccentrically in the upper portion of the drum, and located in the space between the interior cylinder and the outer shell of the drum, said stirring and watering mechanism mounted in bearings independent of and non-revoluble with the drum.

13. The combination, of a revoluble malting-drum, an interior cylinder extending longitudinally in the drum, and watering mechanism located in the space between the interior cylinder and the outer shell of the drum, said watering mechanism mounted in bearings independent of and non-revoluble with the drum.

14. The combination, of a revoluble malting-drum, an interior rotatable cylinder extending longitudinally of the drum, and stirring mechanism located in the space between the interior cylinder and the outer shell of the drum, said stirring mechanism journaled in bearings independent of and unconnected with the heads of the revoluble drum, and extending from but unconnected with the interior cylinder.

In testimony whereof I affix my signature in presence of two witnesses.

JOHN F. DORNFELD.

Witnesses:
A. L. MORSELL,
ANNA V. FAUST.